United States Patent [19]

Ginsberg

[11] 4,054,935
[45] Oct. 18, 1977

[54] SAFETY CONTROL CIRCUIT

[76] Inventor: Leon Ginsberg, 288 Mill Road, P.H. 15, Etobicoke, Ontario, Canada

[21] Appl. No.: 691,178

[22] Filed: May 28, 1976

[51] Int. Cl.² ............................................ H01H 47/22
[52] U.S. Cl. .................................................... 361/189
[58] Field of Search .............. 317/135 R, 135 A, 151; 307/112, 113; 361/189, 156

[56] References Cited

U.S. PATENT DOCUMENTS

| | | | |
|---|---|---|---|
| 3,748,541 | 7/1973 | Ginsberg | 317/135 R |
| 3,793,533 | 2/1974 | Ginsberg | 317/135 R X |
| 3,895,269 | 7/1975 | Geremia | 317/135 R |

*Primary Examiner*—Harry E. Moose, Jr.
*Attorney, Agent, or Firm*—Rogers, Bereskin & Parr

[57] ABSTRACT

A safety control circuit for an electrically operable machine such as a punch press is described. The circuit includes input means for delivering electrical power to the machine and first and second relays, each including switching means and an associated relay coil for operating said switching means. The switching means of the relays are connected in said input means so that electrical power is delivered to the machine only when both relay coils are energized. First and second capacitors are associated respectively with said first and second relay coils and a source of direct current is provided for charging the capacitors. The direct current source is connectable with both capacitors through said switching means of said relays when both relay coils are de-energized, so that the capacitors are both normally charged when the circuit is at rest. First and second machine activating switch means are associated respectively with said first and second capacitors. Each of said switch means is arranged, when operated, to connect the relevant one of said capacitors with the associated relay coil to cause the capacitor to discharge into the coil and operate the relay. The circuit also includes resistor means connectable with either of said capacitors through the switching means of the relays, said switching means being arranged in the event that only one of said machine activating switch means is operated, to connect the capacitor associated with the other switch means to said resistor means, whereby, in use, the relevant capacitor will progressively discharge into the resistor means, preventing energization of the associated relay coil and hence activation of the machine after the level of charge in the capacitor has fallen below that required to energize the associated relay coil.

8 Claims, 3 Drawing Figures

4,054,935

SAFETY CONTROL CIRCUIT

This invention relates to a safety control circuit for an electrically operable machine such, for example as a punch press.

It is conventional practice to provide a punch press with a safety control circuit having two push buttons, both of which must be operated to activate the press. A control circuit of this type is preferably designed so that the press cannot be activated if one push button is held or "tied" down in the closed position so that the circuit is effectively controlled only by the second push button. Circuits which operate in this fashion are referred to as "anti-tiedown" circuits. Also, the control circuit preferably has an "anti-repeat" feature; that is the circuit is designed so that both push buttons must be released to allow the circuit to reset before a new press cycle can be initiated or an interrupted cycle can be re-established.

Examples of prior art safety control circuits are disclosed in my U.S. Pats. Nos. 3,748,541 and 3,793,533 and also in U.S. Pats. Nos. 3,207,957 and 3,895,269.

An object of the present invention is to provide an improved control circuit for an electrically operable machine, the circuit having anti-tiedown and anti-repeat features.

According to the invention the circuit includes input means for delivering electrical power to the machine and first and second relays, each including switching means and an associated relay coil for operating said switching means. The switching means of the relays are connected in said input means so that electrical power is delivered to the machine only when both relay coils are energized. First and second capacitors are associated respectively with said first and second relay coils and a source of direct current is provided for charging the capacitors. The direct current source is connectable with both capacitors through said switching means of said relays when both relay coils are de-energized, so that the capacitors are both normally charged when the circuit is at rest. First and second machine activating switch means are associated respectively with said first and second capacitors. Each of said switch means is arranged, when operated, to connect the relevant one of said capacitors with the associated relay coil to cause the capacitor to discharge into the coil and operate the relay. The circuit also includes resistor means connectable with either of said capacitors through the switching means of the relays, said switching means being arranged in the event that only one of said machine activating switch means is operated, to connect the capacitor associated with the other switch means to said resistor means, whereby, in use, the relevent capacitor will progressively discharge into the resistor means, preventing energization of the associated relay coil and hence activation of the machine after the level of charge in the capacitor has fallen below that required to energize the associated relay coil.

A circuit according to the invention may be designed to operate in a "maintained" mode or in a pulse mode. In a maintained mode circuit, the two machine activating switch means must be maintained in the operated positions during a complete cycle of operation of the machine controlled by the circuit. If either switch means is released before the cycle has been completed, the machine will stop. On the other hand, a circuit which operates in the pulse mode simply requires that both switch means be momentarily operated either simultaneously or within a predetermined time period in order to actuate the machine. The machine will then complete its cycle and stop automatically. Punch presses which require a maintained mode control circuit are normally called part revolution presses and presses which require a pulse mode circuit (often referred to as a trip control) are called full revolution presses.

In order that the invention may be more clearly understood, reference will now be made to the accompanying drawings which illustrate a number of embodiments of the invention by way of example. In the drawings.

Figure 1:
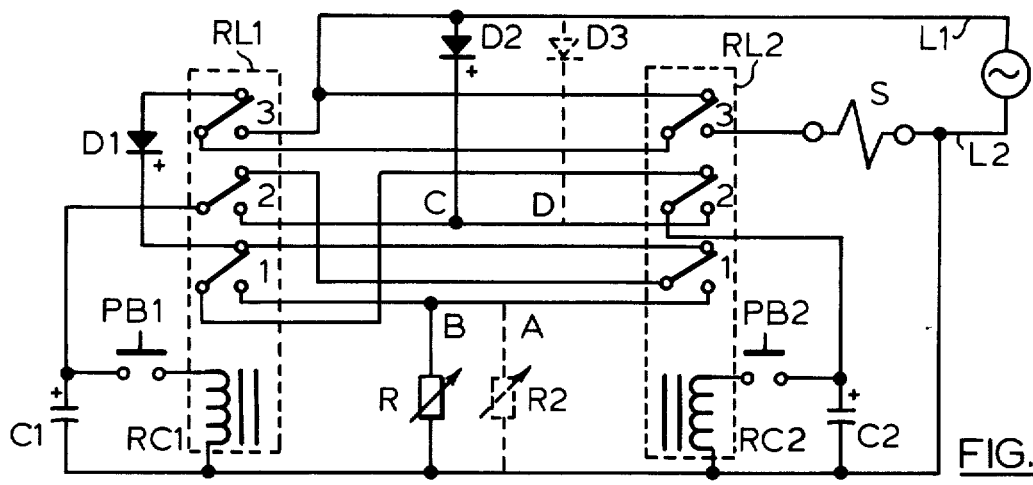
FIG. 1 is a schematic diagram of a maintained mode control circuit for a punch press according to a first embodiment of the invention.

Referring first to FIG. 1, S denotes the main operating solenoid for the press controlled by the circuit; when solenoid S is energized, the press cycle begins. A source of 120 volt alternating current is connected to lines L1 and L2 of the circuit. Two normally open push buttons for operation by the press operator are indicated at PBI and PB2. These push buttons will normally be positioned on the press within easy reach of the operator but spaced from one another such that both push buttons cannot be operated with one hand.

The circuit also includes two relays denoted respectively RL1 and RL2. The relays have respective coils RC1 and RC2 and each relay has three sets of contacts. In FIG. 1, the relays are shown de-energized. The two relay coils RC1 dand RC2 are in connected series with the respective push buttons PB1 and PB2.

The circuit also includes two capacitors C1 and C2 associated with the respective push buttons PB1 and PB2. These capacitors are normally charged when the circuit is in the rest condition shown. Direct current for charging the capacitors is provided by a diode rectifier D1. A second diode D2 is connected between line L1 and a line connecting the No. 2 set of contacts of relay RL1 with the corresponding set of contacts of relay RL2. The purpose of this diode will become apparent later. Finally, the circuit also includes a variable resistor R which can be connected to either of the capacitors C1 or C2 as will be described.

As indicated above, when the circuit of FIG. 1 is in the "rest" condition, both of the capacitors C1 and C2 receive charge through diode D1. If both push buttons are operated simultaneously (or within a predetermined time limit - see later), both capacitors C1 and C2 will discharge into their associated relay coils RC1 and RC2 respectively, operating both relays. All three sets of contacts of both relays will then switch over and the press solenoid S will receive current through the No. 3 sets of contacts of both relays. The two capacitors C1 and C2 will continue to charge by way of diode D2 and will accordingly maintain the relays RL1 and RL2 in the energized condition as long as both push buttons remain closed. If either push button is released, the corresponding relay will drop out and the press solenoid S will no longer receive power, stopping the press. Simultaneously, the capacitor associated with the released push button will progressively discharge through the variable resistor R, preventing the press cycle being re-established after the level of charge in the capacitor has fallen below that required to energize the relay.

For example, assume that both push buttons PB1 and PB2 have been pressed to activate the press solenoid. If push buttons PB1 is now released, relay RL1 will drop out and de-energize solenoid S by way of its No. 3 contacts. Simultaneouslsy, capacitor C1 will be connected with the variable resistor R by way of the No. 2 contacts of relay RL1 and the No. 1 contacts of relay RL2. Capacitor C1 will then progressively discharge through resistor R in a comparatively short time. After that time, if push button PB1 is pressed, relay coil RC1 will not be activated because capacitor C1 is in a discharged condition. The press cycle can only re-established if push button PB 2 is also released and both buttons are pressed simultaneously after the capacitor C1 and C2 have recharged.

Resistor R (which may be termed a "bleeding" resistor) operates in similar fashion to prevent energization of solenoid S if the push buttons PB1 and PB2 are not pressed simultaneously or within a predetermined time interval. Assume, for example, that push button PB1 is operated but PB2 is not. Both capacitors C1 and C2 are in a charged condition and capacitor C1 discharges into relay coil RC1 causing relay RL1 to operate. Capacitor C2 is then connected with resistor R by way of the No. 2 contacts of relay RL2 and the No. 1 contacts of relay RL1 and will discharge in a period of time determined by the resistance value of resistor R.

Resistor R can be adjusted to control the discharge time of the capacitors according to the operating requirements of the control circuit. Typically, the resistor will be adjusted to provide a discharge time of say, one second. In this event, the press will not operate unless both push buttons are pressed simultaneously or within one second of one another. Similarly it will be possible to re-establish a press cycle interrupted by release of one of the push buttons only if that button is operated within one second of its release.

Figure 2:
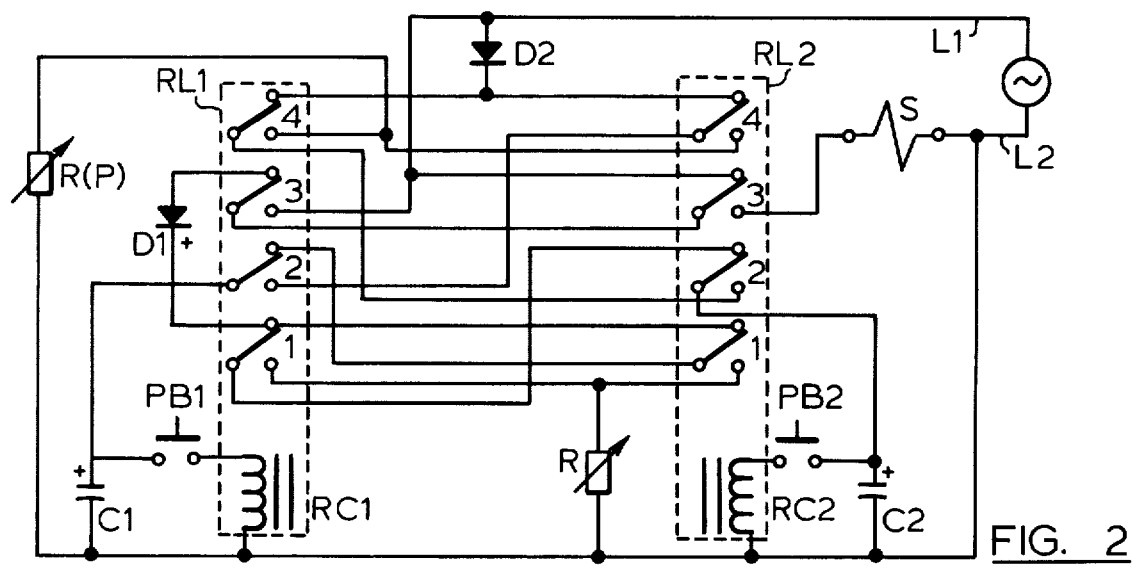
FIG. 2 is a diagram somewhat similar to FIG. 1 showing a pulse mode circuit.

Reference will now be made to FIG. 2 in describing a control circuit designed to operate in the pulse mode. This circuit may be regarded as a modification of the circuit of FIG. 1; similar reference characters have therefore been used to denote like parts in both views.

In the circuit of FIG. 2, the relays RL1 and RL2 each have four sets of contacts. In addition, the circuit includes a second adjustable resistor, denoted R(P), the purpose of which is to limit the duration of the pulse delivered to solenoid S when the circuit is operated. As in the case of FIG. 1, the capacitors C1 and C2 are both normally charged. If both push buttons are operated simultaneously, the relay coils RC1 and RC2 will be energized and solenoid S will receive power from supply lines L1 and L2. Simultaneously, both capacitors C1 and C2 will be connected to the second adjustable resistor R(P) and will discharge into the resistor. For example, capacitor C1 will be connected with resistor R(P) by way of the No. 2 contacts of relay RL1, the No. 4 contacts of relay RL2 and the No. 4 contacts of relay RL1. When the level of charge in either capacitor falls to a value at which the associated relay coil can longer remain energized, that relay will drop out and solenoid S will be disconnected from the power supply. The time for which solenoid S is energized (the pulse duration) will be determined by the resistance valve of resistor R(P) and can be varied by adjusting the resistor.

The situation if only one push button is actuated initially or is released prematurely will be exactly the same as that described in connection with FIG. 1. For example, if push button PB1 is pressed, relay RL1 will be energized and capacitor C2 associated with push button PB2 will be connected to the "bleeding" resistor R by way of the No. 2 contacts of relay RL2 and the No. 1 contacts of relay RL1, causing the capacitor C2 to discharge. The circuit cannot now be activated by pushing button PB2. This can be done only by releasing push button PB1 and operating both buttons simultaneously or within the predetermined time interval allowed by resistor R.

Figure 3:
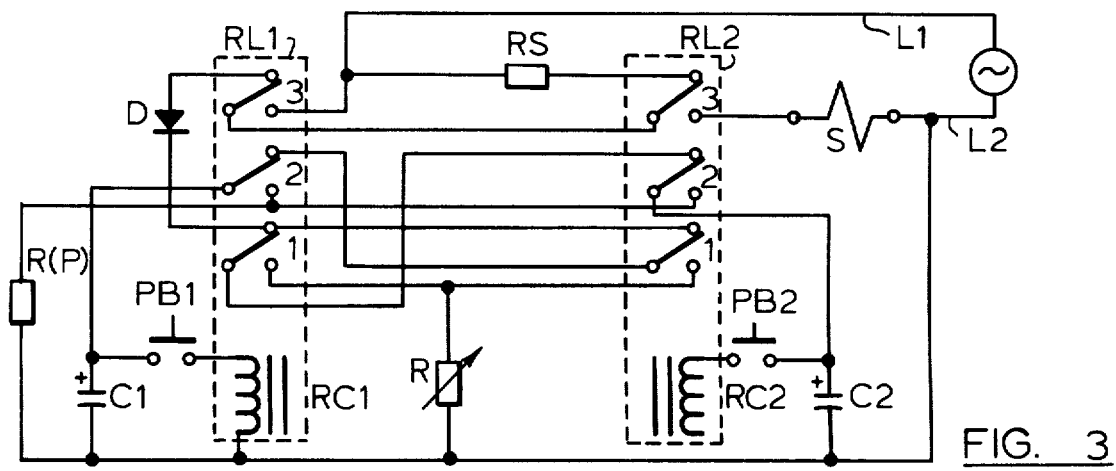
FIG. 3 is a diagram of an alternative pulse mode circuit.

FIG. 3 illustrates a modification of the pulse mode circuit of FIG. 2. In the FIG. 3 circuit, the relays RL1 and RL2 each have only three sets of contacts and only one diode D is used. Also, a resistor RS is connected between power supply line L1 and the No. 3 set of contacts of relay RL2. It will be noted that, in the positions of the relays shown in FIG. 3, resistor RS is in series with diode D and hence in series with the relay coils RC1 and RC2. As in the FIG. 2 embodiment, the circuit of FIG. 3 also includes a variable resistor R(P) for determining the duration of the pulse supplied to the press solenoid S.

If both of the push buttons PB1 and PB2 of FIG. 3 are operated at the same time, the two relay coils RC1 and RC2 are energized as described in connection with the preceding embodiment. Operation of the relays disconnects the direct current charging source for the capacitors C1 and C2 via diode D and connects the capacitors to the variable resistor R(P). The capacitors discharge into resistor R(P); the resistor determines how long the relays RL1 and RL2 are held in their operated positions and hence the duration of the pulse delivered to the press solenoid. When the charge in either capacitor falls to a level at which the voltage is insufficient to maintain the associated relay coil in an energized condition, the relay will drop out and the solenoid circuit will be interrupted as described above.

If either of both push button are maintained closed at this time, the resistor R(S) and the relay coil or coils still connected will form a voltage divider which will prevent either capacitor reaching the voltage level required to operate the associated relay. In other words, the level of charge in the capacitors will provide insufficient potential to energize the relay coils because of the substantial voltage drop which occurs across the resistor R(S) in series with the relay coils. The solenoid cannot be reactivated unless both push buttons are released and the capacitors C1 and C2 are allowed to recharge from diode D.

If only one push button is operated when both capacitors C1 and C2 are fully charged, the other capacitor will be connected to the "bleeding" resistor R and will discharge unless the push button associated with that capacitor is operated within a predetermined time interval (e.g. 1 second). For example, if push button PB1 is closed (assuming both capacitors are fully charged), capacitor C2 will be connected with resistor R by way of the No. 2 contacts of relay RL2 and No. contacts of RL1. If push button PB2 is not closed within the predetermined time interval referred to above, the level of charge in capacitor 2C will be insufficient to energize relay coil RC2. Simultaneously with energization of relay coil RC1, capacitor C1 will be connected to the pulse duration determining resistor R(P); relay RC1 will therefore drop out after a predetermined time interval determined by that resistor.

As a modification of the circuits of FIGS. 1 to 3, the variable resitor R described may be replaced by two similar resistors each associated with one of the capacitors. For example, referring to FIG. 1, a second variable resistor is indicated in chain line at R2 and is connected between the power supply line L2 and a point denoted A on the line joining the No. 1 sets of contacts of the two relays. The corresponding point of connection of resistor R is indicated at B. The points A and B are disconnected from one another. In the circuit so modified, each capacitor C1 or C2 discharges into its associated resistor R or R2 respectively. The resistance of each resistor R or R2 can be adjusted as appropriate to determine the discharge time of the associated capacitor. This allows individual control over the discharge times of the respective capacitors and provides additional flexibility in circuit operation.

The circuit of FIG. 1 may be modified to cater for a machine having more than one operator. In this event, either or both of the push buttons PB1 or PB2 may be replaced by a more complex switching arrangement designed to ensure, for example, that each operator has activated a switch associated with his control station before the relevant capacitor is connected to the associated relay coil. Similar arrangements may be made to cater, for example, for a machine in which a number of preliminary operations must be performed before the press solenoid can be energized. For example, the number of switches associated with the additional operators or work stations of the machine may be series connected between the relevant capacitor and the associated relay coil so that the coil will be energized only when all of the switches have been closed.

In a maintained mode circuit modified as indicated above, it may be desirable to provide separate diodes to maintain the voltage in each relay coil after the circuit has been initially activated. An additional diode is indicated in chain line at D3 in FIG. 1 and is connected between power line L1 and the line joining the No. 2 contact sets of the relays. The points of connection of the relays D2 and D3 to this line are denoted C and D respectively; the portion of the line between points C and D will be disconnected where two diodes are used.

It will be appreciated that the circuits described above all have anti-tiedown anti-repeat features. In other words, circuits are designed so that they will not operate if one push button is held or "tied" down in the closed position prior to operating the other push button. Also, a new press cycle cannot be initiated or an interrupted cycle re-established unless both push buttons are released and subsequently operated simultaneously.

It is to be noted, finally, that the preceding description applies to specific embodiments of the invention only and that many modifications are possible within the broad scope of the claims. For example, the variable "bleeding" resistors R described above may be replaced by non-adjustable resistor(s) of predetermined value. Also, it is to be understood that FIGS. 1 to 3 are schematic circuit diagrams only. Specific values have not been assigned to the various components indicated since the specific components used will vary according to operational requirements. Resistors and/or other components may be included in the circuits where necessary as will be readily apparent to a person skilled in the art.

What I claim as my invention is:

1. A safety control circuit for an electrically operable machine, the circuit comprising:
   input means for delivering electrical power to the machine;
   first and second relays each including switching means and an associated relay coil for operating said switching means, the switching means of said relays being connected in said input means so that electrical power is delivered to the machine only when both relay coils are energized;
   first and second capacitors associated respectively with said first and second relay coils;
   a source of direct current for charging the capacitors, said direct current source being connectible with both capacitors through said switching means of said relays when both relay coils are de-energized, whereby the capacitors are both normally charged when the circuit is at rest;
   first and second machine activating switch means associated respectively with said first and second capacitors and each arranged, when operated, to connect the relevant one of said capacitors with the associated relay coil to cause the capacitor to discharge into the coil and operate the relay; and
   resistor means connectible with either of said capacitors through the switching means of said relays, said switching means being arranged, in the event that only one of said machine activating switch means is operated, to connect the capacitor associated with the other switch means to said resistor means whereby, in use, the relevant capacitor will progressively discharge into the resistor means, preventing energization of the associated relay coil and hence activation of the machine after the level of charge in the capacitor has fallen below that required to energize the relevant relay coil.

2. A circuit as claimed in claim 1, which is designed to operate in a maintained mode, and which further comprises:
   a second source of direct current connectable with each of said first and second capacitors through the switching means of the respective relays, said switching means being arranged so that each capacitor is connected to said second source of direct current when the relay coil associated with the capacitor is in the energized condition, whereby charging current for the capacitor is maintained after the associated relay coil has been energized upon operation of the relevant machine activating switch means.

3. A circuit as claimed in claim 1 which is designed to operate in a pulse mode, wherein said input means is connected to a solenoid arranged to activate the machine when supplied with a pulse of electrical energy, and wherein in the circuit further comprises:
   pulse duration - determining resistor means connectable with said capacitors through the switching means of the respective relays, said switching means being arranged so that each capacitor is connected with said resistor means when the relay coil associated with the capacitor is in the energized condition, whereby operation of both machine activating switch means in use causes the capacitors both to discharge into said pulse duration-determining resistor means and to energize the associated relay coils, so that electrical energy is delivered to said solenoid until the level of charge in one of said capacitors falls to a value at which the associated relay coil drops out, causing said input means to be disconnected from the solenoid.

4. A circuit as claimed in claim 3, further comprising: resistor means connectable in series with said relay coils through said switching means when both of said relay coils are in the de-energized condition, said resistor means being arranged so that, if at least one of said machine activating switch means is maintained in the operated condition when both relay coils are de-energized, the voltage drop across said resistor means will prevent recharging of the capacitor associated with the operated switch means.

5. A circuit as claimed in claim 1, wherein said input means is arranged to deliver alternating electrical current to the machine, and wherein said source of direct current for charging the capacitors comprises diode means connected in said input means.

6. A circuit as claimed in claim 5, wherein said diode means comprises first and second diodes connectable respectively with said first and second capacitors, whereby each capacitor is provided with a separate source of direct current.

7. A circuit as claimed in claim 1, wherein the said resistor means is adjustable to allow variation in the discharge time of a capacitor connected thereto.

8. A circuit as claimed in claim 1, wherein said resistor means comprises first and second resistors connectable with the respective capacitors through said switching means of the relays, whereby each resistor forms a discharge path only for the associated capacitor.

* * * * *